(12) United States Patent
Bruno et al.

(10) Patent No.: US 9,665,729 B2
(45) Date of Patent: *May 30, 2017

(54) REVOCATION OF APPLICATION ON MOBILE DEVICE

(75) Inventors: John Bruno, Snoqualmie, WA (US); Nathaniel Clinton, Sammamish, WA (US); Kamran R. Zargahi, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1303 days.

This patent is subject to a terminal disclaimer.

(21) Appl. No.: 12/422,790

(22) Filed: Apr. 13, 2009

(65) Prior Publication Data

US 2010/0262959 A1    Oct. 14, 2010

(51) Int. Cl.
*G06F 21/62* (2013.01)

(52) U.S. Cl.
CPC .................... *G06F 21/6209* (2013.01)

(58) Field of Classification Search
CPC ....................................................... G06F 21/6209
See application file for complete search history.

(56) References Cited

U.S. PATENT DOCUMENTS

| | | | | |
|---|---|---|---|---|
| 5,715,403 | A | * | 2/1998 | Stefik ............................. 705/44 |
| 6,009,401 | A | * | 12/1999 | Horstmann .................... 705/59 |
| 6,226,618 | B1 | * | 5/2001 | Downs et al. .................. 705/51 |
| 6,236,971 | B1 | * | 5/2001 | Stefik et al. .................... 705/54 |
| 6,725,262 | B1 | * | 4/2004 | Choquier et al. ............. 709/221 |
| 6,981,252 | B1 | | 12/2005 | Sadowsky |
| 7,035,920 | B2 | | 4/2006 | Harrison et al. |
| 7,899,917 | B2 | * | 3/2011 | Chitre ................. H04L 67/1095 707/610 |
| 8,463,884 | B2 | * | 6/2013 | Clinton .................... G06F 8/65 709/221 |
| 2002/0082997 | A1 | * | 6/2002 | Kobata et al. .................. 705/51 |

(Continued)

FOREIGN PATENT DOCUMENTS

| | | |
|---|---|---|
| JP | 2005184278 A | 7/2005 |
| KR | 1020040040561 A | 5/2004 |
| KR | 1020050091461 A | 9/2005 |

OTHER PUBLICATIONS

Broadcast Engineering website, "Clippz launches carrier-free mobile video clip downloading site," Jul. 3, 2007, Penton Media, Inc., all pages.*

(Continued)

*Primary Examiner* — Jacob C. Coppola
(74) *Attorney, Agent, or Firm* — Alleman Hall Creasman & Tuttle LLP

(57) ABSTRACT

Embodiments related to the revocation of applications on mobile devices are disclosed. For example, one disclosed embodiment provides a method of revoking an application stored on a mobile device, wherein the method comprises receiving an application revocation request, the application revocation request comprising an instruction to revoke a selected application saved on one or more mobile devices, sending to a mobile device an application revocation instruction configured to revoke the selected application on the mobile device, and sending to another entity a request to roll back a previously-made transaction related to the selected application.

11 Claims, 5 Drawing Sheets

(56) References Cited

U.S. PATENT DOCUMENTS

| | | |
|---|---|---|
| 2002/0083430 A1 | 6/2002 | Kusuda et al. |
| 2003/0032417 A1 | 2/2003 | Minear et al. |
| 2004/0044779 A1* | 3/2004 | Lambert ................. 709/229 |
| 2004/0254975 A1 | 12/2004 | Teh et al. |
| 2004/0267552 A1* | 12/2004 | Gilliam et al. ............. 705/30 |
| 2005/0240536 A1* | 10/2005 | Davis et al. .............. 705/75 |
| 2006/0089126 A1 | 4/2006 | Frank et al. |
| 2007/0016961 A1* | 1/2007 | Vogler et al. ............. 726/30 |
| 2007/0150886 A1* | 6/2007 | Shapiro ................ G06F 8/61 |
| | | 717/174 |
| 2008/0051076 A1 | 2/2008 | O'Shaughnessy et al. |
| 2008/0183800 A1* | 7/2008 | Herzog ............ H04L 67/1095 |
| | | 709/202 |
| 2010/0125610 A1* | 5/2010 | Zaffino ........... G06F 17/30017 |
| | | 707/793 |
| 2010/0262958 A1* | 10/2010 | Clinton .............. H04W 8/245 |
| | | 717/171 |
| 2010/0262959 A1* | 10/2010 | Bruno et al. .............. 717/171 |
| 2011/0202914 A1* | 8/2011 | Kim ..................... G06F 8/61 |
| | | 717/178 |

OTHER PUBLICATIONS

"International Search Report", Mailed Date: Nov. 30, 2010, Application No. PCT/US2010/038414, Filed Date: Jun. 11, 2010, pp. 8.

* cited by examiner

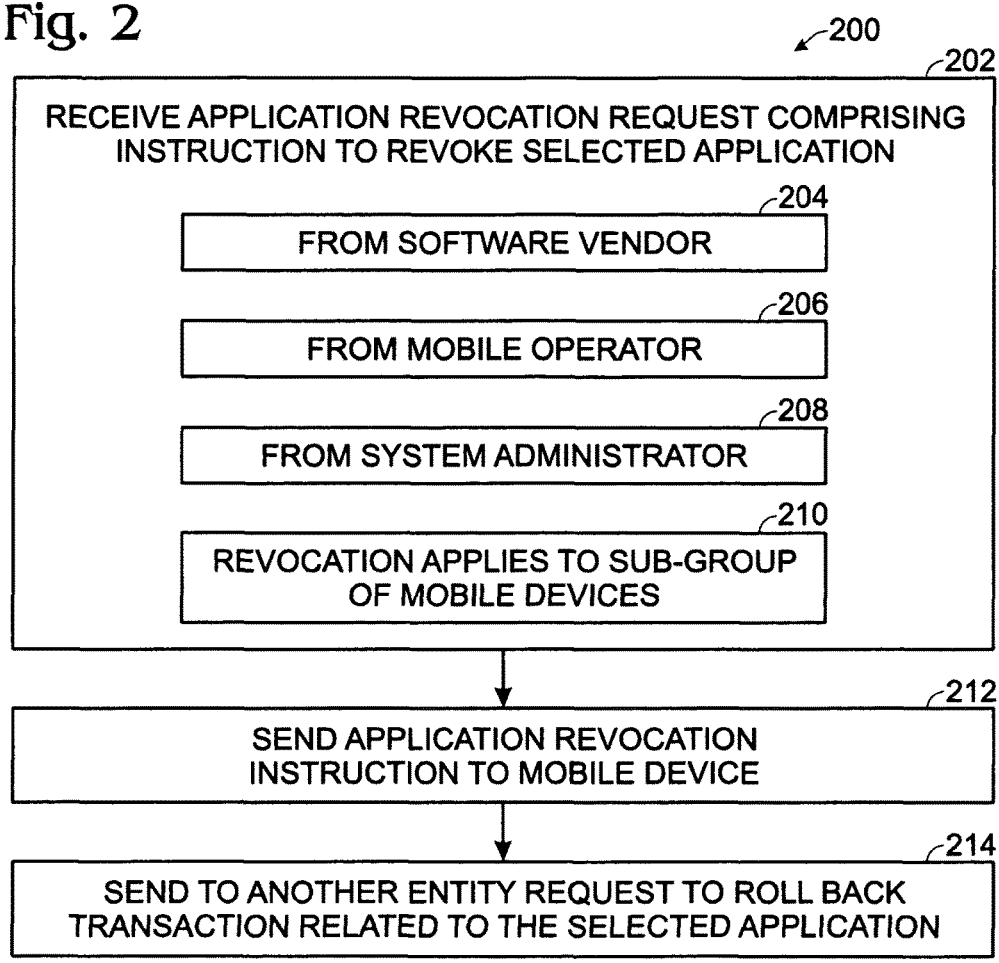
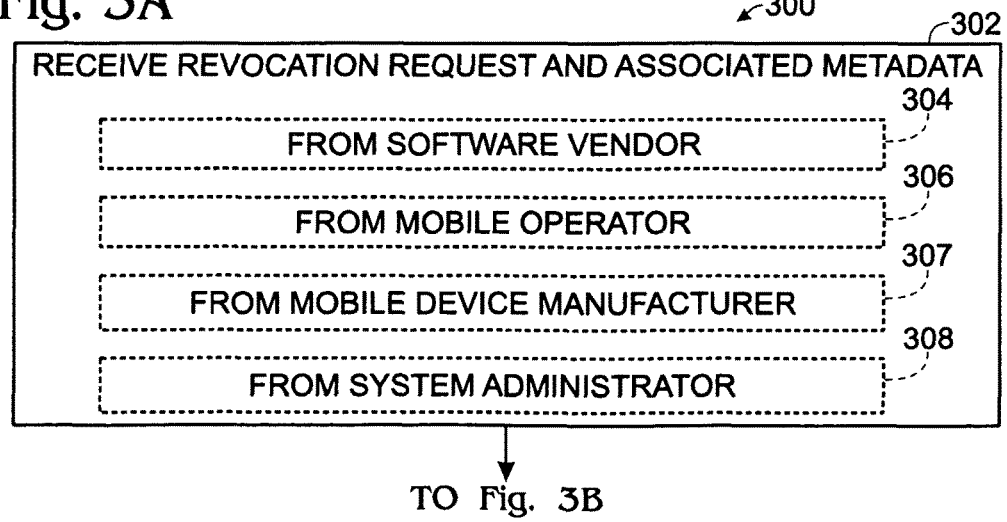

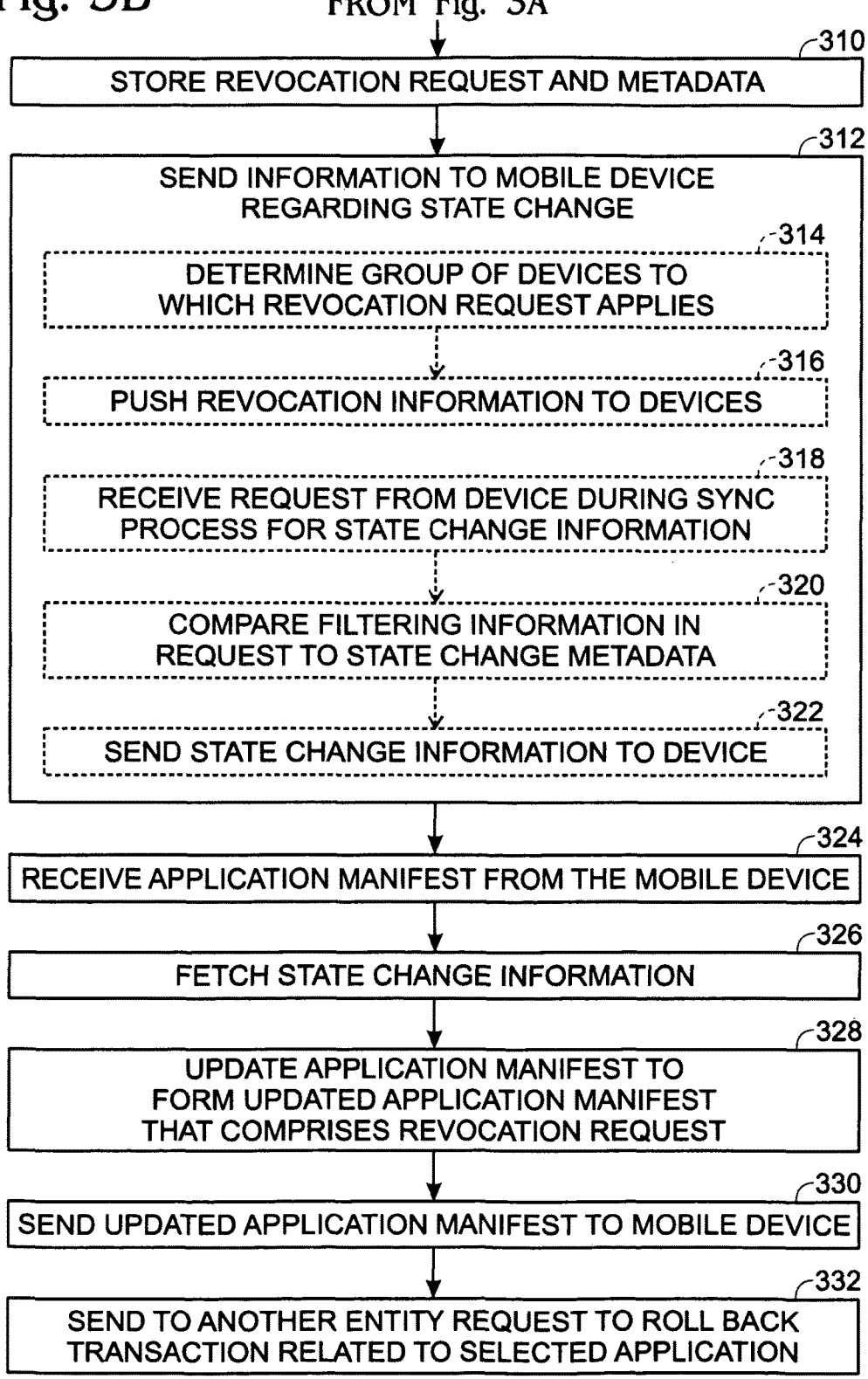

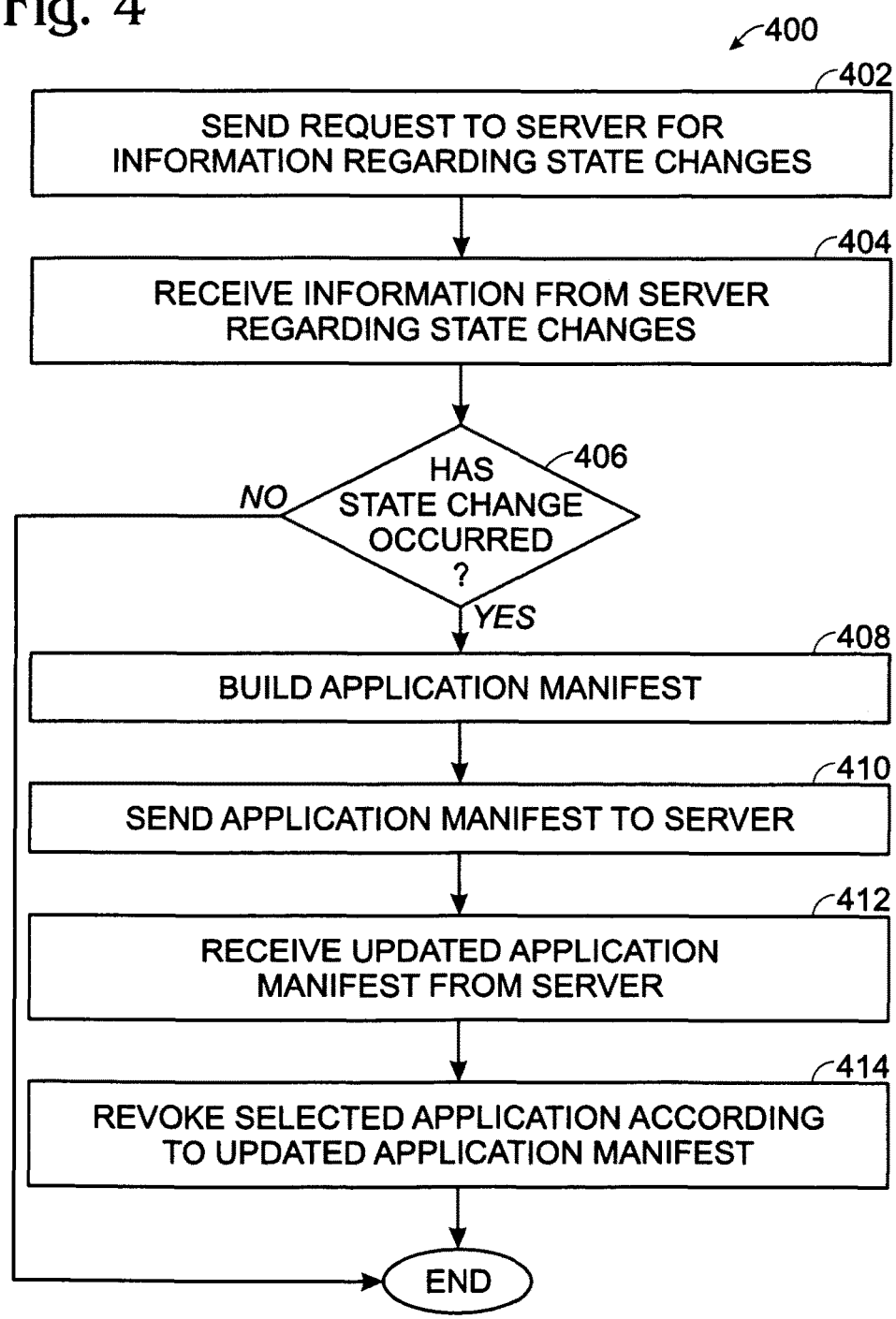

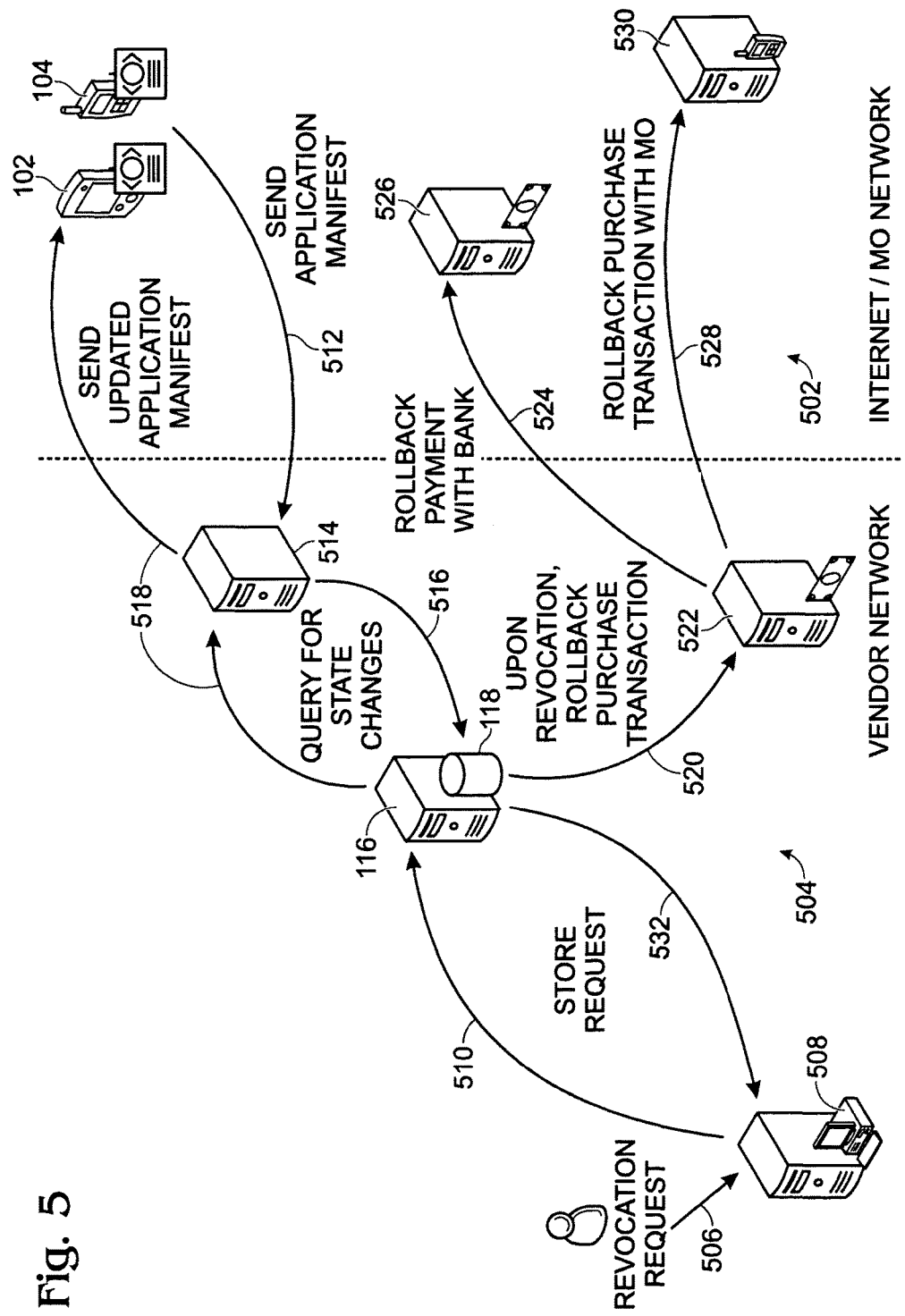

REVOCATION OF APPLICATION ON MOBILE DEVICE

BACKGROUND

Various mobile devices, including but not limited to smart phones, netbooks, other notebook computers, personal media players, and the like, may be configured to allow a user to install and run various applications such as games, utilities, etc. Such applications may be provided by an Internet-connected service provider, such as a mobile service provider, mobile device manufacturer, mobile device software manufacturer, and/or third party, via an application server that acts as an "application store" from which users can download applications, sometimes for a fee.

In some situations, it may be wished to revoke an application that is currently available to users and has previously been downloaded by one or more users. For example, if it is determined that an application poses a security risk, it may be desired to remove the application from users' mobile devices. In use environments where users obtain applications from a single source, such as an application server managed by a mobile device manufacturer, via a single channel, such as a desktop client running on a computer to which the mobile device is connected, revocation of an application may be fairly straightforward. However, in other situations, it may be desired to revoke an application from a sub-group of a larger group of users that have previously obtained the application, and who may have obtained the application through multiple different channels. Such revocation may pose challenges. Further, in some cases, business transactions, such as payments performed when a user acquired a revoked program, may pose additional challenges to revocation.

SUMMARY

Accordingly, various embodiments are disclosed herein related to the revocation of applications on mobile devices. For example, one disclosed embodiment provides a method of revoking an application stored on a mobile device, wherein the method comprises receiving an application revocation request, the application revocation request comprising an instruction to revoke a selected application saved on one or more mobile devices, sending to a mobile device an application revocation instruction configured to revoke the selected application on the mobile device, and sending to another entity a request to roll back a previously-made transaction related to the selected application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows an embodiment of a method for revoking an application previously provided to a mobile device.

FIG. 3 shows an embodiment of another method for revoking an application previously provided to a mobile device.

FIG. 4 shows an embodiment of a method for revoking an application on a mobile device, from the perspective of the mobile device.

FIG. 5 shows a schematic depiction of an embodiment of a system and method for revoking an application on a mobile device.

DETAILED DESCRIPTION

Figure 1:
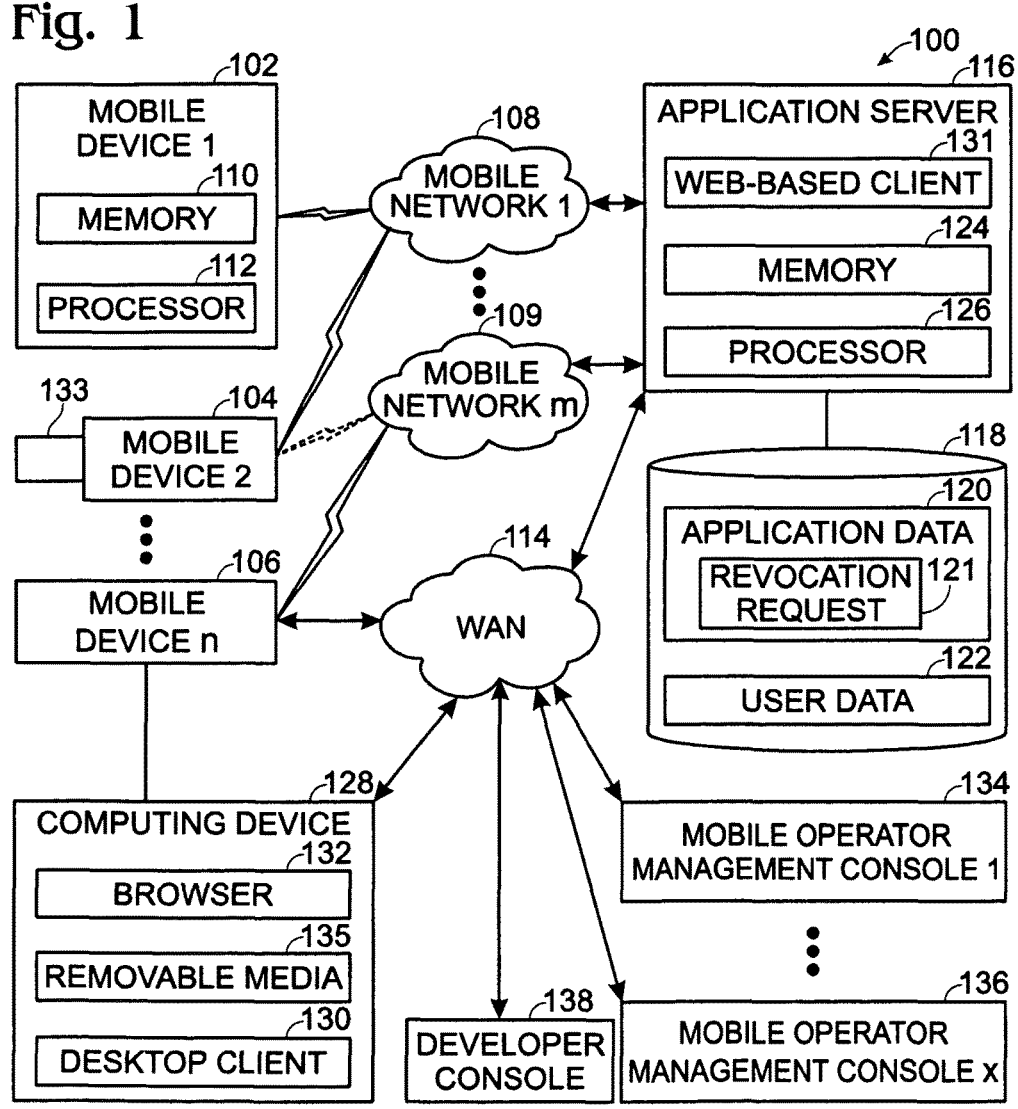
FIG. 1 shows an embodiment of a mobile device use environment.

Embodiments are disclosed herein that relate to the revocation of applications from mobile devices in complex use environments. For example, the disclosed embodiments may be used where mobile device users may have obtained an application through various different channels, where revocations apply to a sub-group of a larger group of users of an application, and/or that provide for the roll-back of a transaction that occurred when a user originally obtained a revoked application or application version. It will be understood that the terms "revoke", "revocation", "revoked application" and the like as used herein may apply to revocations of an entire application, revocations of a version of an application (i.e. where a version is removed but leaves another version in place), a revocation of a functionality and/or module of an application (i.e. leaving other functionalities active), and any other suitable limitation of a user's ability to use any aspect of an application. Further, these terms may refer to a total removal of an application from storage on a mobile device, or may comprise "blacklisting" an application such that the application remains stored on a device, but is rendered unusable.

Before discussing the revocation of an application on a mobile device, an example embodiment of a mobile device use environment 100 is described with reference to FIG. 1. Mobile device use environment 100 comprises a plurality n of mobile devices (depicted as three mobile device 102 (mobile device 1), 104 (mobile device 2), 106 (mobile device n)) that are in communication with a plurality m of mobile networks, depicted as two example mobile networks 108 (network 1) and 109 (network m). Via mobile networks 108, 109, mobile devices 102, 104, 106 may communicate with each other in various ways, including but not limited to via voice data, text messaging, email, etc. In the depicted embodiment, three mobile devices communicating with two mobile networks are shown for the purpose of example, but it will be understood that any suitable number of mobile devices may be in communication with any suitable number of mobile networks. Generally, each mobile device will communicate preferentially with a primary mobile network associated with a mobile operator with whom a user has a billing account associated with the device, but may connect to other mobile networks if the primary mobile network is not connectable (e.g. out-of-range), as indicated by the dashed-line connection of mobile device 104 to mobile network 109.

Each mobile device comprises memory 110 configured to store computer-readable instructions such as applications and other programs, and a processor 112 configured to execute the applications and other programs stored in memory 110. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

Mobile devices 102, 104, 106 also may be in communication with a TCP/IP data network, such as a WAN 114, as another channel of communication. For example, as depicted in FIG. 1, mobile device n 106 may be configured to connect to a WAN such as the Internet via a wireless protocol such as 802.11a, 802.11b, 802.11g, 802.11n, or any other suitable protocol.

Mobile devices 102, 104, 106 may communicate with a mobile device application server 116 via the mobile networks 108, 109 and/or WAN 114. Application server 116 further may be in communication with one or more databases, represented by database 118 in FIG. 1, that store mobile device applications and various items of data related to the provision of applications to mobile devices. For example, as depicted in FIG. 1, the database 118 may comprise application data 120. Such application data 120 may include binary (or other type) application files that are downloadable by mobile devices 102, 104, 106, actions that have been requested for such application files, such as revocation requests 121 that have been made for selected applications.

The application data 120 may contain applications provided by multiple developers and/or vendors for multiple different types and brands of mobile devices, each of which may run different operating systems and/or different versions of like operating systems. Therefore, the application data 120 further may include metadata related to the application files that allow users of mobile devices 102, 104 106 to use search queries to locate desired applications that are compatible with the users' mobile devices. The metadata that is stored as application data 120 may comprise any suitable information. For example, the metadata may include information regarding the device type, operating system, operating system version, and mobile operator identity for which a particular application is intended for use. The application metadata also may include information regarding the cost of the application, any promotional pricing changes or the like to be applied to the application, information regarding the geographic markets and end-user language for which the application is intended, editorial content such as media and consumer reviews of an application, any mobile operator-specific business policies that are to be applied to the purchase and/or use of an application, and/or any other suitable type of metadata related to applications stored in the database 118.

Database 118 also may store user data 122. The user data 122 may include data related to individual users, including but not limited to a user's identity, account number, credit card/debit card/other payment mechanism, type of mobile device used by each user, geographic location of each user, language preferences of each user, etc. This data may allow applications that are incompatible with a user's mobile device, geographic location, language, etc. to be filtered from a database query for applications.

Continuing with FIG. 1, the mobile device application server 116 comprises memory 124 configured to store computer readable instructions executable by a processor 126 and/or other logic components to perform the various tasks in the course of managing the provision of applications to mobile devices. For example, such instructions may be executable to communicate with mobile devices 102, 104, 106 over the mobile network 108 and WAN 114 to provide applications, to synchronize state, revoke applications, etc.; to communicate with the database 118 to execute search queries and communicate search results to the mobile devices 102, 104 106; and to perform various other functions and operations, including but not limited to those described herein.

The mobile device application server 116 also may be configured to provide applications to mobile devices via other communication channels. For example, as depicted in FIG. 1, a mobile device 106 may be configured to be connected (via a tether, wireless connection, etc.) to a computing device 128, such as a laptop or desktop computer, to allow communication with the application server 116 via the computing device 128. Such communication may take place via a desktop client 130 installed on the computing device 128, via a network-based client 131 ("web-based client) on mobile device application server 116 executed via an Internet browser application 132, or in any other suitable manner. It will be understood that such a browser also may be run directly on mobile devices 102, 104, 106.

End-users of the mobile devices 102, 104, 106 also may be able to load applications onto a mobile device in ways other than during a communication session with the application server 116. For example, a removable media storage device, such as a flash memory drive or the like, may be used to side load an application onto a mobile device. In FIG. 1, example side load scenarios are depicted as a removable storage medium 133 coupled to mobile device 104, and also a removable storage media receptacle/connector 135 provided on computing device 128. It will be understood that a mobile device may be configured to synchronize any state changes made via a side load with the mobile device application server 116 upon the occurrence of a side load of new content.

Continuing with FIG. 1, mobile operators may be able to interact with the mobile device application server 116 via a mobile operator management console. A plurality x of mobile operator management consoles are shown as two example consoles 134, 136, but it will be understood that any suitable number of mobile operators may be in communication with the mobile device application server 116 via any suitable number of management consoles. Each mobile operator management console 134, 136 may allow a mobile operator to submit new applications for inclusion in the database 118, to submit updates and new versions to existing applications, to submit promotions for applications, to modify pricing, business rules, and other information related to specific applications, to revoke applications, and to take any other suitable action related to programs submitted by a mobile operator and/or configured to be operated on devices that access the mobile operator's network.

Various other parties besides a mobile operator also may be able to submit applications, and control various aspects of previously-submitted programs, on the mobile device application server 116. For example, some programs may be provided by third-party software developers and/or vendors, either affiliated with or not affiliated with a specific mobile operator. Such developers and/or vendors may submit applications, updates, revocations, for inclusion on the mobile device application server 116 via a developer console 138 that may be provided, for example, as a part of a software development kit provided by the operator of the mobile device application server 116, by a mobile operator, etc. Likewise, applications, updates, revocations, etc. from a third-party developer and/or vendor may be submitted either through a mobile operator, or directly to the application server 116, via WAN 114 or other suitable communication channel. A single developer console is shown for the purpose of example, but it will be understood that any suitable number of developers and/or vendors may communicate with the application server 116 via development consoles.

It will be understood that mobile device use environment embodiment depicted in FIG. 1 is shown for the purpose of example, and is not intended to be limiting in any manner.

Unlike mobile device use environments in which applications for a single type of device operated on a single mobile operator's mobile network are obtained through a single channel (e.g. a desktop client), the depicted mobile device use environment 100 allows a mobile device user to obtain applications from many different sources, for many different devices operated by many different mobile operators, and via many different channels. For example, a user may obtain applications over the air (OTA) via a mobile network; via a WAN such as the Internet accessed by a desktop client or a web browser; via side loads, either by connecting a removable media directly to a mobile device or by a removable media connected to a computing device to which the mobile device is connected; and/or via any other suitable channel.

Due to the many different ways a user may obtain applications from the mobile device application server 116, propagating an application revocation request to relevant mobile devices (i.e. mobile devices on which the revoked application is stored) may pose challenges. Further, due to having applications for different mobile operators, different geographic regions, different languages, different devices, etc. all provided by a single mobile device application server 116, in some circumstances, it may be desirable to revoke an application from a sub-group of mobile devices/users, such that only a portion of users of an application are subject to the revocation request.

Accordingly, FIG. 2 shows an embodiment of a method 200 of revoking an application on a mobile device that addresses various such issues. First, method 200 comprises receiving, at 202, an application revocation request that comprises an instruction to revoke a selected application. As described above, this instruction may comprise an instruction to revoke an entire application by removal or blacklisting, an instruction to revoke an application version (leaving another version active), an instruction to remove or disable a functionality of an application (leaving other functionalities active), or any other suitable instruction that restricts the ability of a user to use an application or application function.

The revocation request may be received from various different entities. For example, as depicted in FIG. 2, the revocation instruction may be received from a vendor or developer 204, for example, if a flaw or bug is discovered in an application. Further, the revocation instruction may be received from a mobile operator 206, for example, to enforce a business and/or legal policy (e.g. where an application does not meet legal standards of a jurisdiction in which a mobile device is operated), to protect network and/or device security (e.g. where an application may pose a security risk). Likewise, the revocation instruction may be received from a system administrator 208 for the mobile device application server, or from a mobile device manufacturer 209. It will be understood that these examples of entities from which a revocation request may be received are disclosed for the purpose of example, and are not intended to be limiting in any manner.

As described above, in some situations, it may be desired to revoke an application from a sub-group of mobile devices/users that have obtained the application, for example, due to a change in a legal/regulatory environment of a particular geographic sub-region in which an application is used. Therefore, as shown at 210, the revocation request may specify a sub-group of mobile devices/users to which the request is to be applied. The revocation request may specify such a sub-group in any suitable manner. For example, as described above in the context of FIG. 1, various items of metadata may be stored in database 118 for each available application, including but not limited to a device type, device operating system/operating system version, mobile operator identity for which a particular application is intended for use, geographic markets/currency and end-user language(s) for which the application is intended, mobile operator-specific business policies that are to be applied to the purchase and/or use of an application, etc. As such, the revocation request may include values for any these categories of metadata (and/or any other suitable metadata) that specifies the sub-group of mobile devices/users subject to the revocation request.

As a more specific example, if an English language version of an application that runs on a specific type of mobile device that is used in several English-language jurisdictions becomes in violation of a legal standard in one country (for example, where a new law is passed that affects the application), an application revocation request may specify the country in which the revocation is to be performed. When mobile devices associated with that country contact the mobile device application server for synchronization, the mobile device application server may use device identification information in the request to determine that the mobile device is within the sub-group of mobile devices for which revocation is intended.

Continuing with method 200, after receiving the application revocation request, an application revocation instruction is sent, at 212, to one or more mobile devices on which the revoked application is stored. In some embodiments, the application revocation instruction is sent upon receiving a synchronization request from a mobile device, while in other embodiments, the application revocation instruction may be pushed to mobile devices, without waiting for receipt of a synchronization request. The application revocation instruction may be pushed, for example, where it is determined that an application poses a security risk, or in any other suitable situation. Further, the revocation instruction may be configured to cause the selected application to be deleted from storage on the mobile device, or may be configured to mark the selected application as blacklisted, but allow it to remain in storage.

After sending the application revocation instruction to one or more mobile devices at 212, method 200 next comprises, at 214, sending to another entity a request to roll back a transaction related to the selected application. For example, in the case where a user had purchased the application to obtain it for the user's mobile device, the request may comprise a request to roll back the purchase transaction. In this instance, the request to roll back the transaction may be sent to the entity that performed the purchase transaction. Examples of such entities include, but are not limited to, financial companies such as banks, credit card companies, etc., as well as mobile operators, software vendors, and other such entities.

In this manner, a selected application may be removed from one or more mobile devices in a highly granular manner that may be limited to a sub-group of mobile devices, and that does not involve any user steps to accomplish the revocation and to obtain a refund (or accomplish a roll-back of any other transaction related to the original application purchase).

As mentioned above, a revocation instruction may, in some embodiments, be sent to a mobile device during a routine synchronization process. FIG. 3 shows a flow diagram depicting an embodiment of a method 300 of revoking an application during a synchronization process in which a mobile device synchronizes its state with a state of a mobile device application server. First, at 302, method 300 comprises receiving a revocation request. The revocation request may be received, for example, from a software vendor 304, a mobile operator 306, a mobile device manufacturer 307, a system administrator 308, or any other suitable entity. Further, the revocation request may comprise metadata describing the group of mobile devices to which the revocation request applies. For example, the revocation request may comprise metadata regarding one or more of a mobile operator used by the sub-group, a geographic region, a language, an operating system, an operating system version, and a mobile device type to which the revocation request applies. Next, method 300 comprises, at 310, storing the revocation request and associated metadata, for example, in a database accessible by the mobile device application server.

Next, at 312, method 300 comprises sending information to a mobile device regarding the state change. This information may be sent in various different manners. For example, in some situations, the information may be pushed to a mobile device. Therefore, as indicated at 314, method 300 may comprise determining a group of mobile devices to which the revocation applies (for example, by comparing the metadata associated with the revocation request to user account and user device metadata), and then, at 316, pushing the revocation information to the relevant mobile devices.

In other situations, the information may be send to a mobile device upon receiving a request for the information, for example, during a synchronization process. Therefore, as indicated at 318, method 300 may comprise receiving a request form a mobile device for information regarding any state changes that have occurred since a last synchronization, and determining whether a state change relevant to the requesting has occurred. This determination may be performed, for example, by comparing filtering information contained in the request received from the device (e.g. device identification information, market information, mobile operator information, and/or other suitable information) to the metadata related to the revocation request, as indicated at 320. This determination may allow the revocation request to be applied only to a sub-group of device, such as devices in a specific market. If the revocation request applies to the requesting device, then method 300 comprises, at 322, sending a response to the mobile device confirming that a state change has occurred at the mobile device application server.

Next, method 300 comprises, at 324, receiving an application manifest from the mobile device. The application manifest comprises information regarding the applications stored on the mobile device, identifying information, and any other suitable information. For example, the application manifest may contain a user and/or device identification, an identification of each application stored on the mobile device (currently, as well as formerly in some embodiments), as well as various items of information regarding each application, such as a status of the application (i.e. version number, revocation status, etc.), dates on which each application were installed/uninstalled/modified, etc. It will be understood that these types of information are set forth for the purpose of example, and are not intended to be limiting in any manner.

The application manifest received at 324 from the mobile device may have any suitable format. In one specific embodiment, the manifest comprises an XML (eXtensible Markup Language) document in which the above-described items of information are contained as values. An example of an embodiment of an XML application manifest is described in more detail below.

Continuing with FIG. 3, method 300 next comprises, at 326, fetching state change information from a database. The state change information may be fetched, for example, by querying the database with information regarding the mobile device type, mobile device ID, application information obtained from the application manifest, etc. to locate state change information relevant to the particular mobile device. Then, an updated application manifest is formed at 328 with the state change information, including the revocation request, and is sent to the mobile device at 330. The mobile device may then use the updated application manifest to take any appropriate actions based upon the information in the updated application manifest, including revoking the selected application.

The updated application manifest may have any suitable form. For example, in one specific embodiment, the updated application manifest comprises an XML document that contains the information in the application manifest received from the mobile device, with modifications to reflect any state change information relevant to those applications. Further, the updated application manifest also may include information regarding new applications that have been made available to the mobile device, and/or server-specific state changes, such as control settings. An example of an updated XML manifest is shown below, where the updated manifest contains two application elements, one of which illustrates the inclusion of a revocation instruction as a value of an attribute of one of the application elements.

```
<?xml version="1.0" encoding="utf-8"?>
<appManifest dateTime="">
    <Device id="" type="" lastConnect="">
    <application id="" hash="" state="" path=""
installDate="" uninstallDate="" action="revoke">
    <Description> Description>
    <Error></Error>
    </application>
    <application id="" hash="" state="" path=""
installDate="" uninstallDate="" action="update">
    <Description> Description>
        <Notification>
          <ServerError>
            <Error>0x65400987</Error>
            <Description>Server is busy</Description>
          </ServerError>
          <SetSyncInterval inhours="24" />
        </Notification>
     </Device>
</appManifest>
```

In the depicted updated manifest embodiment, the "action" attribute in the first application element has a value of "revoke", indicating to the mobile device that the identified application is to be revoked. Likewise, the second application element has an "action" attribute with a value of "update", indicating to the mobile device that an update is available to the identified application.

The mobile device may be configured to read the updated application manifest and take appropriate actions based upon the state changes contained in the updated manifest, including but not limited to revoking an application or prompting a user to agree to the installation of a new version of an application. It can also be seen that the updated manifest comprises an element for setting a synchronization frequency ("<SetSyncInterval inhours="24"/>"), which may be updated by the mobile application server by changing the value of the "inhours" attribute. It will be understood that the depicted updated application manifest is shown for the purpose of example, and is not intended to be limiting in any manner.

In addition to sending the updated application manifest to the mobile device, method 300 also comprises, at 332, sending to another entity a request to roll back a transaction related to the selected application. For example, as described above, in the case where a user had purchased the application to obtain it for the user's mobile device, the request may comprise a request to roll back the purchase transaction. In this instance, the request to roll back the transaction may be sent to the entity that performed the purchase transaction. Examples of such entities include, but are not limited to, financial companies such as banks, credit card companies, etc., as well as mobile operators, software vendors, and other such entities.

FIG. 4 shows an embodiment of a method 400 of synchronizing a state on a mobile device with a state on a mobile device application server, shown from the perspective of a mobile device. Method 400 first comprises, at 402, sending a request to the mobile device application server for information regarding any state changes that have occurred at the mobile device application server. The request may include filtering information, such as mobile device identification information, mobile operator identification information, market identification information, and/or any other suitable filtering information. Such filtering information may allow the server to determine whether any state changes have occurred that are applicable for the requesting mobile device. Next, at 404, method 400 comprises receiving a response from the server that comprises information regarding any state changes that have occurred, including any revocation requests for applications stored on the device.

If it is determined at 406 that the response shows that no state changes have occurred, then method 400 may end until a next synchronization takes place. On the other hand, if it is determined that 406 that one or more state changes have occurred, such as the receipt of a revocation request, then method 400 comprises, at 410, building an application manifest at 408, and then sending the application manifest to the mobile device application server at 410. As described above, the application manifest may comprise identities of all of the applications that are stored on the mobile device. The application manifest also may store other information, such a list of applications that have previously been installed but have been removed from the mobile device due to revocation, as well as various items of information about saved and/or revoked applications, such as a date of installation, date of revocation, version, etc. In some embodiments, the application manifest may comprise an XML document, while in other embodiments, the application manifest may take any other suitable form.

After sending the application manifest to the mobile device application server, method 400 next comprises receiving an updated application manifest from the server. As described above in the context of FIG. 3, the updated application manifest contains the information in the application manifest sent from the mobile device, with modifications made to that information to reflect any state change information relevant to those applications. Further, the updated application manifest also may include information regarding new applications that have been made available to the mobile device, as well as changes to a server state (i.e. changes to synchronization frequency and the like).

Upon receipt of the updated application manifest from the mobile device server, method 400 next comprises, at 414, revoking the selected action according to the revocation instruction contained in the updated application manifest. Other state changes may be made as well. For example, if the updated application manifest comprises an "update" instruction, the mobile device may either automatically obtain the update from the mobile device application server (if the update is mandatory), or may prompt a user to alert the user of the availability of the update and then present the user the option of installing the updated version of the application. Further, the updated application manifest also may comprise information regarding any new applications that are available for the mobile device, based upon the device's identity, mobile operator, geographic location, language preferences, operating system, etc. In this case, the user may be presented with the option of installing a newly available application. The updated manifest also may comprise a new server setting to be applied, such as a new synchronization frequency. It will be understood that the above-described state changes are presented for the purpose of example, and are not intended to be limiting in any manner.

FIG. 5 shows a schematic depiction of an embodiment of a system and method for revoking an application on a mobile device in the manner described above. Dashed line 500 depicts a boundary between external networks 502 (Internet/Mobile Operator networks) and a network of a mobile device application vendor ("vendor network" 504) that administers a mobile device application server 116 and associated database 118. It will be understood that the specific components of the system that are illustrated are shown for the purpose of example, and are not intended to be limiting in any manner.

First, at 506, a revocation request is received at an administrative console 508 of the vendor network. It will be understood that the revocation request may originate either from within the vendor network (e.g. by a system administrator of the mobile device application server), or may be received at the administrative console 508 from a location outside of the vendor network 504, such as from a mobile operator, mobile device manufacturer, or third-party software developer or vendor (i.e. submitted via a mobile operator management console or third party developer console, as shown in FIG. 1). The revocation request may apply to all instances of the application on devices, or to a sub-group of devices identified in any suitable manner (e.g. device type, mobile operator, operating system/operating system version, geographic location, language, etc.). Next, the revocation request is sent to mobile device application server 116, as indicated at 510, and stored in database 118.

Next, if a mobile device becomes aware of a state change that has occurred (for example, by sending an inquiry (not shown) to the mobile device application server 116 or receiving a pushed message from the mobile device application server 116), mobile devices 102, 104 each may send to the mobile device application server 116 an application manifest, as indicated at 512. In the depicted embodiment, these requests are sent to a network interface 514, and then forwarded, at 516, to the mobile device application server 116. The mobile device application server 116 then queries the database 118 to fetch status changes for the requesting mobile devices 102, 104, and returns, at 518, any status changes, including revocation requests, to the mobile devices 102, 104, as updated application manifests.

Upon updating the application manifest for each of mobile devices 102, 104, a request to roll back a business transaction related to the revoked application is sent, at 520, to network interface 522. From the network interface, the roll back request is sent, at 524, to a financial company server 526, and/or is sent, at 528, to a mobile operator server 530, to roll back a purchase of, or other business transaction related to, the revoked application. Likewise, an acknowledgement of the roll back may be sent to administrative console 508, as indicated at 532.

In this manner, a revocation of a selected application may be accomplished, and associated business transaction rolled back, for any desired group of users of the selected application. Additionally, the disclosed embodiments may work with third-party supplied applications without any specific development hooks or API usage.

It will be understood that the configurations and/or approaches described herein for revoking applications on a mobile device are presented for the purpose of example and not intended to be limiting, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. In a mobile-device application server, a method of revoking an application stored on a plurality of mobile devices associated with a plurality of users, the method comprising:
   receiving, at the mobile-device application server, an application revocation request to revoke a selected application;
   receiving, from each mobile device of the plurality of mobile devices, a synchronization request;
   for each mobile device of the plurality of mobile devices, in response to receiving the synchronization request, determining that a state change has occurred that is relevant to the mobile device;
   for each mobile device of the plurality of devices, in response to determining that the state change has occurred, sending the mobile device a response notifying of the state change and receiving an application manifest comprising a document listing applications that are installed on the mobile device, wherein one or more of the mobile devices comprises a side-loaded copy of the selected application;
   for each mobile device from which an application manifest was received, fetching state change information by querying a database with information from the application manifest;
   for each mobile device from which an application manifest was received, sending from the mobile-device application server to the mobile device an updated application manifest for the mobile device such that an application revocation instruction configured to revoke the selected application is sent to the one or more mobile devices comprising the side-loaded copy of the selected application; and
   for each application revocation instruction sent, sending from the mobile-device application server to a third-party server a request to roll back a previously-made transaction related to the selected application.

2. The method of claim 1, wherein the application revocation request is received from one or more of a mobile operator, a system administrator, an application developer, and an application vendor.

3. The method of claim 1, wherein the application revocation instruction comprises a value of an attribute in the updated application manifest.

4. The method of claim 1, further comprising storing the application revocation request in a database upon receiving the application revocation request.

5. The method of claim 1, further comprising pushing application revocation information to one or more mobile devices after receiving the application revocation request.

6. The method of claim 1, wherein sending the updated application manifest to the mobile device comprises sending the updated application manifest to one of a mobile phone, a notebook computer, and a portable media player.

7. The method of claim 1, wherein sending the request to roll back comprises sending the request to roll back to a financial transaction processing company that previously processed a purchase of the selected application.

8. The method of claim 1, wherein sending the request to roll back comprises sending the request to roll back to a mobile operator that previously processed a purchase of the selected application.

9. The method of claim 1, wherein the application revocation request specifies a sub-group of users to whom the revocation is to be applied, and wherein the application is not revoked for users outside the sub-group.

10. The method of claim 9, wherein the sub-group of users is specified by one or more of a mobile operator used by the sub-group, a geographic region, a language, an operating system, an operating system version, and a mobile device type.

11. The method of claim 9 wherein the sub-group of users is defined as a group of users within a specified jurisdiction.

* * * * *